J. A. ETZOLD.
VEHICLE WHEEL.
APPLICATION FILED APR. 26, 1910.
1,027,409.
Patented May 28, 1912.
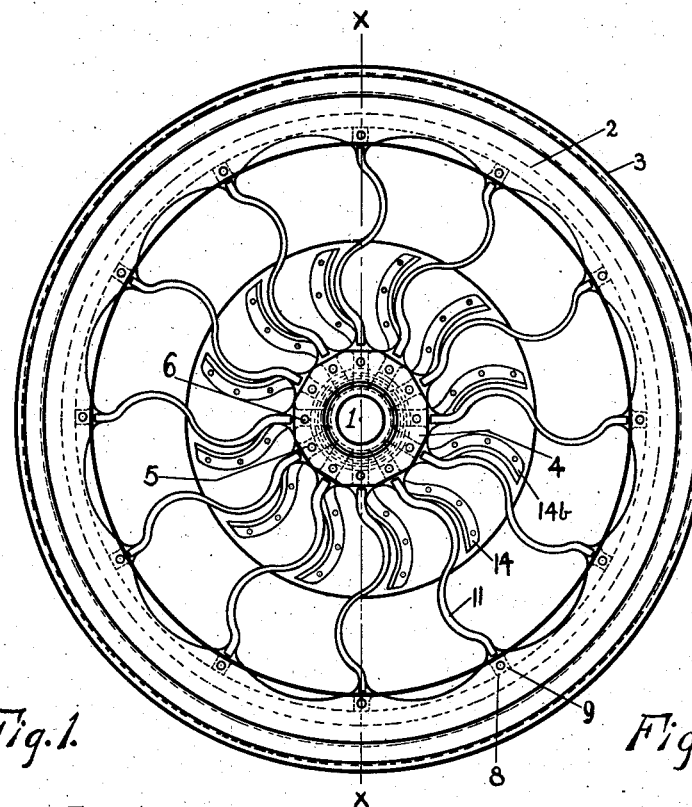
Fig.1.
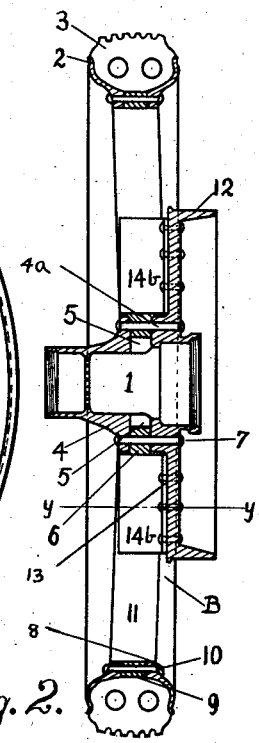
Fig.2.
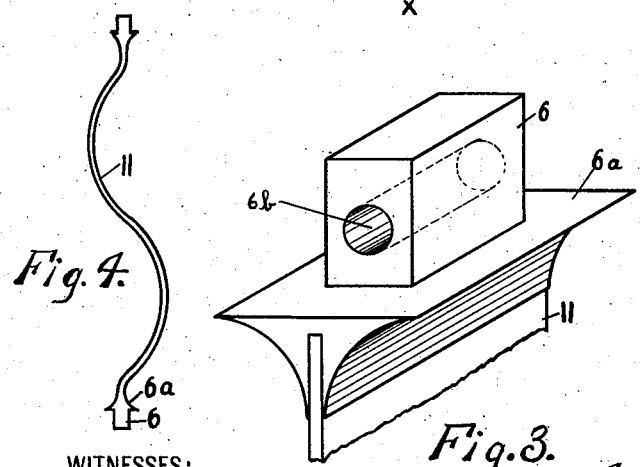
Fig.3.
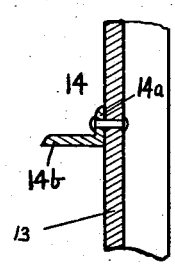
Fig.5.
Fig.4.
WITNESSES:
J. Ray Abbey.
Christine A. Braidel.
INVENTOR
John A. Etzold.
BY
Geo. B. Willcox.
ATTORNEY

UNITED STATES PATENT OFFICE.

JOHN A. ETZOLD, OF DETROIT, MICHIGAN.

VEHICLE-WHEEL.

1,027,409.   Specification of Letters Patent.   Patented May 28, 1912.

Application filed April 26, 1910. Serial No. 557,772.

*To all whom it may concern:*

Be it known that I, JOHN A. ETZOLD, a citizen of the United States, residing at Detroit, in the county of Wayne and State of Michigan, have invented certain new and useful Improvements in Vehicle-Wheels; and I do hereby declare the following to be a full, clear, and exact description of the invention, such as will enable others skilled in the art to which it appertains to make and use the same.

This invention relates to wheels and pertains more particularly to that class of vehicle wheels in which the spokes are adapted to yield or spring when the wheel encounters obstructions or unevennesses in the road.

My improvement is particularly adapted to automobile wheels and the like, and the objects of the improvement are to provide a wheel having yielding spokes of such construction as to permit the felly to move circumferentially relative to the hub, the yielding spokes being of such construction as to readily permit such movement, while preventing lateral or side-wise movement of the felly, the improved spring-spoke being as rigid laterally as the ordinary rigid spoke; and to provide means whereby the yielding spoke is supported against circumferential yielding when the wheel is subjected to sudden and extraordinary turning stress, as for instance, when the vehicle is suddenly started, or when emergency brakes are suddenly applied.

My invention is illustrated in the accompanying drawings, in which—

Figure 1 is a side view of an automobile wheel made in accordance with my improvement, Fig. 2 is a transverse section taken on the line $x$—$x$ of Fig. 1, Fig. 3 is a perspective detail of the tenoned end of one of the spokes, Fig. 4 is a diagrammatic detail of one form of spoke, and Fig. 5 is an enlarged transverse section taken on the line $y$—$y$ of Fig. 2.

As is clearly shown in the drawings, the wheel consists in the usual hub 1, and a felly 2 carrying any suitable tire 3. The hub is formed with a flange 4 formed with radial pockets or mortises 5 to receive the end members 6 of the spokes, which are secured in said pockets by bolts, rivets or other suitable fastenings 7, passing through apertures $4^a$ in the flange 4, and through apertures $6^b$ in the spoke end 6. Similar pockets 8 are provided in the felly 2 to receive the outer ends 9 of the spokes, the ends being held in place by rivets or other fastenings 10. The spoke end is composed of a tenon 6 of rectangular or other suitable form, and has a base $6^a$ to which a flexible spoke 11 is secured. The base $6^a$ is preferably formed integral with the tenon 6, being cast in one piece therewith. The end of the spoke 11 is rigidly secured to the base $6^a$ in any suitable manner, as by inserting the end of the spoke 11 in a mold and pouring the base $6^a$ around it. The outer end of the spoke is formed in the same manner. The contour of the spoke in side elevation is preferably that of an ogee or reverse curve, as shown in Figs. 1 and 4. The spoke is preferably flat and of considerable width, as shown in Fig. 2, to present a wide surface in the direction transverse to the plane of the wheel, thereby giving the necessary lateral stiffness to the felly 2, and for the same purpose the tenon 6, the base $6^a$, and the bolt or rivet 7 are snugly fitted together. If desired, the tenon 6 may be shrunk into the pocket 5 of the flange 4 by first heating the latter, then inserting the tenon and allowing the hub to cool and the same process may be applied to inserting the tenons of the outer ends of the spokes into the pockets of the felly. The tenon may, if desired, be inserted into the pocket by a press fit.

When my improved spokes are applied to the rear or driving wheels of a motor vehicle, the brake drum 12 is preferably secured to the flange 4 in the usual manner. To the outer flat face 13 of the brake drum is secured a plurality of stops 14, each adapted to engage the back face of one of the yielding spokes 11 and to rigidly support the spoke so that when the spoke is in contact with the stop, only that part of the spoke will yield which lies between the stop and the felly, thereby making the wheel under such conditions much more rigid than it is in normal action, where the stop is out of contact with the spoke. The stops come into action as supports or reinforcing means for the spokes when the vehicle is suddenly started or when emergency brakes are suddenly applied. If no brake drum is used, the stops may be secured to a radial flange carried by the hub, or formed integral with it. In practice I prefer to make the stops as shown in Figs. 1, 2 and 5. In the preferred form the stop 14 consists of a curved angle bar, of which one flange 14ª is riveted or otherwise secured to the flat face 13 of the drum 12, the other flange 14ᵇ projecting at right angles to the face 13 and curved to the contour which the spoke 11 assumes when the wheel encounters an obstruction and the springing action of spoke 11 is brought into play.

The spoke 11 may be made of any suitable material, as for instance, a suitable grade of spring steel, it being only essential that the spoke shall have the proper amount of yield and sufficient width to give it the degree of lateral stiffness required in practice.

What I claim as my invention and desire to secure by Letters Patent, is:—

1. In a wheel, the combination with a hub and felly, of a brake drum fixed to the hub, of yielding spokes bent to an ogee curve, the ends of said spokes being rigidly secured to the hub and felly respectively, stops fixed to the face of the brake drum, said stops formed of angle bar and each having one of its flanges curved and adapted to engage the curved face of one of said spokes.

2. In a wheel, the combination with a hub and felly, of yielding spokes bent to an ogee curve, the ends of said spokes being rigidly secured to the hub and felly respectively, curved stops carried by the hub and normally out of contact with said spokes, the stops adapted to engage and unyieldingly support the back faces of the spokes when the spokes are flexed.

In testimony whereof, I affix my signature in presence of two witnesses.

JOHN A. ETZOLD.

Witnesses:
  A. M. REID,
  BLANCHE G. REID.

---

Copies of this patent may be obtained for five cents each, by addressing the "Commissioner of Patents, Washington, D. C."